（12）United States Patent
Tyler

(10) Patent No.: US 10,396,343 B2
(45) Date of Patent: Aug. 27, 2019

(54) SEALING PATCH FOR ELECTROLYTE FILL HOLE

(71) Applicant: Johnson Controls Technology Company, Holland, MI (US)

(72) Inventor: Matthew R. Tyler, Brown Deer, WI (US)

(73) Assignee: CPS TECHNOLOGY HOLDINGS LLC, New York, NY (US)

( * ) Notice: Subject to any disclaimer, the term of this patent is extended or adjusted under 35 U.S.C. 154(b) by 214 days.

(21) Appl. No.: 14/704,812

(22) Filed: May 5, 2015

(65) Prior Publication Data

US 2016/0329552 A1   Nov. 10, 2016

(51) Int. Cl.
| | | |
|---|---|---|
| *H01M 10/00* | (2006.01) | |
| *H01M 2/36* | (2006.01) | |
| *H01M 2/02* | (2006.01) | |
| *H01M 2/08* | (2006.01) | |
| *H01M 2/10* | (2006.01) | |
| H01M 10/0525 | (2010.01) | |
| B60L 50/64 | (2019.01) | |

(52) U.S. Cl.
CPC ........... *H01M 2/365* (2013.01); *H01M 2/024* (2013.01); *H01M 2/0262* (2013.01); *H01M 2/08* (2013.01); *H01M 2/1072* (2013.01); *H01M 2/362* (2013.01); B60L 50/64 (2019.02); H01M 2/1077 (2013.01); H01M 10/0525 (2013.01); H01M 2220/20 (2013.01); Y02E 60/122 (2013.01); Y02P 70/54 (2015.11); Y02T 10/705 (2013.01)

(58) Field of Classification Search
CPC .... H01M 2/362; H01M 2/365; H01M 2/1077; H01M 2/0262; H01M 2/1072; H01M 2/08; H01M 2/024; H01M 2220/20; H01M 10/0525; B60L 50/64; Y02T 10/705; Y02P 70/54; Y02E 60/122
See application file for complete search history.

(56) References Cited

U.S. PATENT DOCUMENTS

| | | | |
|---|---|---|---|
| 2,584,946 | A | 2/1952 | Viarengo |
| 3,223,558 | A | 12/1965 | Purcell, Jr. |
| 3,824,327 | A | 7/1974 | Barker et al. |
| 4,572,877 | A | 2/1986 | Botos |
| 4,987,519 | A | 1/1991 | Hutchins et al. |

(Continued)

FOREIGN PATENT DOCUMENTS

| | | |
|---|---|---|
| CA | 2165152 A1 | 6/1997 |
| CN | 202585612 | 12/2012 |

(Continued)

OTHER PUBLICATIONS

Machine translation of JP 2005-149909 obtained Jan. 26, 2017.*

(Continued)

*Primary Examiner* — Nicholas P D'Aniello
(74) *Attorney, Agent, or Firm* — Fletcher Yoder, P.C.

(57) ABSTRACT

A lithium-ion battery cell includes an enclosure that includes a casing and a lid. The enclosure has an electrolyte fill hole disposed on a surface of the casing opposite the lid. An electrochemical cell is disposed within the enclosure. Additionally, a sealing patch is laser welded to the surface of the casing around the electrolyte fill hole, wherein the sealing patch is configured to seal the electrolyte fill hole.

21 Claims, 8 Drawing Sheets

(56) References Cited

U.S. PATENT DOCUMENTS

| | | |
|---|---|---|
| 5,229,223 A | 7/1993 | Hyland |
| 5,381,301 A | 1/1995 | Hudis |
| 5,585,207 A * | 12/1996 | Wakabe .................. H01M 2/06 |
| | | 429/178 |
| 5,693,430 A | 12/1997 | Iwatsu et al. |
| 5,821,010 A | 10/1998 | Taylor |
| 6,001,504 A | 12/1999 | Batson et al. |
| 6,045,944 A | 4/2000 | Okada et al. |
| 6,190,798 B1 | 2/2001 | Okada et al. |
| 6,327,137 B1 | 12/2001 | Yamamoto et al. |
| 6,447,949 B2 * | 9/2002 | Iwata .................... B23K 26/28 |
| | | 429/171 |
| 6,455,193 B1 | 9/2002 | Miyazaki et al. |
| 6,573,000 B1 | 6/2003 | Miyazaki et al. |
| 7,070,881 B2 | 7/2006 | Kishiyama et al. |
| 7,511,941 B1 | 3/2009 | Gallay et al. |
| 7,754,378 B2 | 7/2010 | Yim et al. |
| 8,003,248 B2 | 8/2011 | Freitag et al. |
| 8,092,938 B2 | 1/2012 | Woo |
| 8,227,112 B2 | 7/2012 | Suzuki et al. |
| 2002/0150813 A1 | 10/2002 | Park et al. |
| 2006/0024573 A1 | 2/2006 | Yim et al. |
| 2006/0051667 A1 | 3/2006 | Kim et al. |
| 2010/0304194 A1* | 12/2010 | Boucher ............... H01M 2/361 |
| | | 429/50 |
| 2012/0070723 A1 | 3/2012 | Matsui et al. |
| 2012/0298638 A1* | 11/2012 | Beck ...................... B23K 26/24 |
| | | 219/121.64 |
| 2013/0108918 A1 | 5/2013 | Kambayashi |
| 2014/0065451 A1 | 3/2014 | Furh et al. |
| 2014/0255769 A1 | 9/2014 | Gao et al. |
| 2014/0322565 A1 | 10/2014 | Kusama et al. |

FOREIGN PATENT DOCUMENTS

| | | | |
|---|---|---|---|
| EP | 0452070 A2 | | 10/1991 |
| JP | 2003257414 A | | 9/2003 |
| JP | 2004296195 A | | 10/2004 |
| JP | 2004327214 A | | 11/2004 |
| JP | 2004327453 A | * | 11/2004 |
| JP | 2005149909 | | 6/2005 |
| JP | 2007035343 A | | 2/2007 |
| JP | 2009146719 A | | 7/2009 |
| JP | 2014067664 | | 4/2014 |

OTHER PUBLICATIONS

Machine translation of JP-2004327453-A, obtained May 22, 2018 (Year: 2004).*

PCT/US2016/017719 International Search Report and Written Opinion dated Jun. 8, 2016.

* cited by examiner

SEALING PATCH FOR ELECTROLYTE FILL HOLE

BACKGROUND

The present disclosure relates generally to the field of batteries and battery modules. More specifically, the present disclosure relates to sealing an electrolyte fill hole of a battery cell.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and may operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with the internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, many battery modules for xEVs may use battery cells having a liquid electrolyte for ion conduction between electrodes. The liquid electrolyte may be injected into the battery cells via an electrolyte fill hole on the battery cell housing, and the electrolyte fill hole may then be sealed. However, many processes for sealing an electrolyte fill hole may cause the housing to be weakened. In some instances, electrolyte may leak from the battery cell through cracks in the housing, while other contaminants introduced during the manufacturing process and/or during use may leak into the battery cell through the cracks in the housing. Accordingly, it is now recognized that it would be beneficial to improve the processes for sealing the electrolyte fill hole in a manner that avoids compromising the structural integrity of the battery cell housing or the fill hole seal itself (e.g., around the sealed electrolyte fill hole).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a lithium-ion battery cell includes an enclosure that includes a casing and a lid. The enclosure has an electrolyte fill hole disposed on a surface of the casing opposite the lid. An electrochemical cell is disposed within the enclosure. Additionally, a sealing patch is laser welded to the surface of the casing around the electrolyte fill hole, wherein the sealing patch is configured to seal the electrolyte fill hole.

In a second embodiment, a method of manufacturing a lithium-ion battery cell includes injecting a liquid electrolyte into a cavity of an enclosure of the lithium-ion battery cell via an electrolyte fill hole formed in the enclosure. The method includes disposing a sealing patch over the electrolyte fill hole, wherein the sealing patch covers the electrolyte fill hole and the surface of the enclosure around the electrolyte fill hole; and laser welding the sealing patch to the surface of the enclosure around the electrolyte fill hole. The weld between the sealing patch and the surface of the enclosure is a partial penetration weld.

In a third embodiment, a lithium-ion battery module includes a housing having at least two terminals and a plurality of battery cells disposed within the housing and electrically coupled to the at least two terminals. Each battery cell of the plurality of battery cells includes an enclosure comprising a casing and a lid, wherein the enclosure has an electrolyte fill hole configured to receive an electrolyte and a sealing patch disposed over the electrolyte fill hole. The electrolyte fill hole is disposed on a surface of the casing opposite the lid and the sealing patch is laser welded to a surface of the casing around the electrolyte fill hole. The weld between the sealing patch and the surface of the enclosure is a partial penetration weld.

DRAWINGS

Various aspects of this disclosure may be better understood upon reading the following detailed description and upon reference to the drawings in which.

Figure 4:
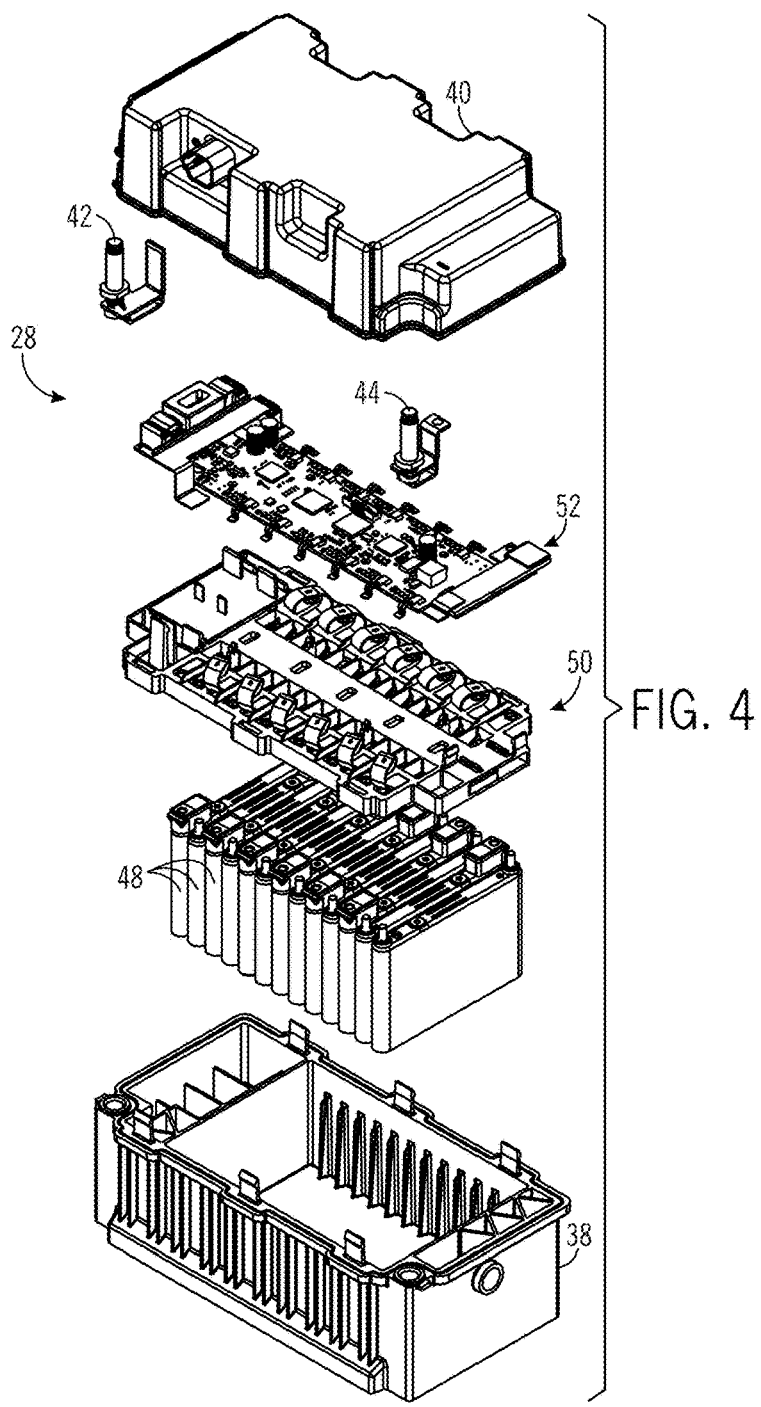
FIG. 4 is an exploded perspective view of the battery module of FIG. 3, in accordance with an embodiment of the present approach.
Figure 12:
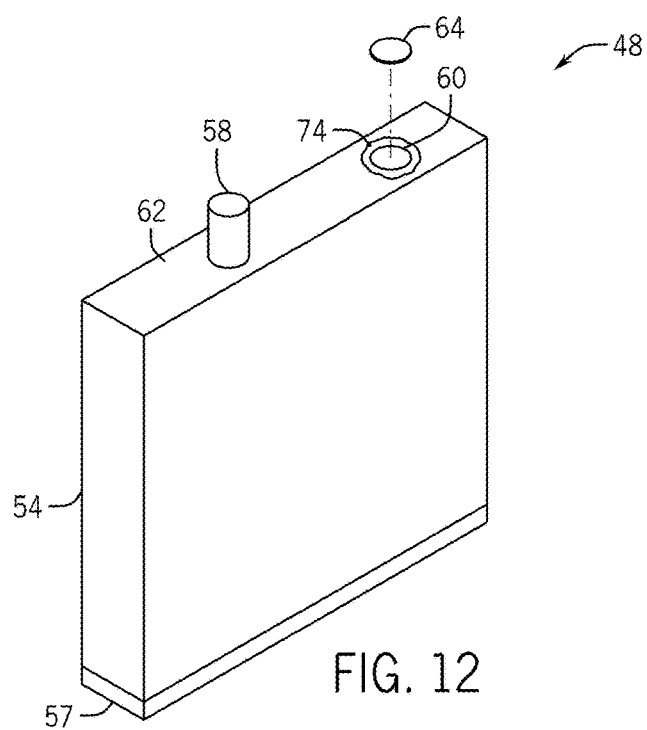
Figure 13:
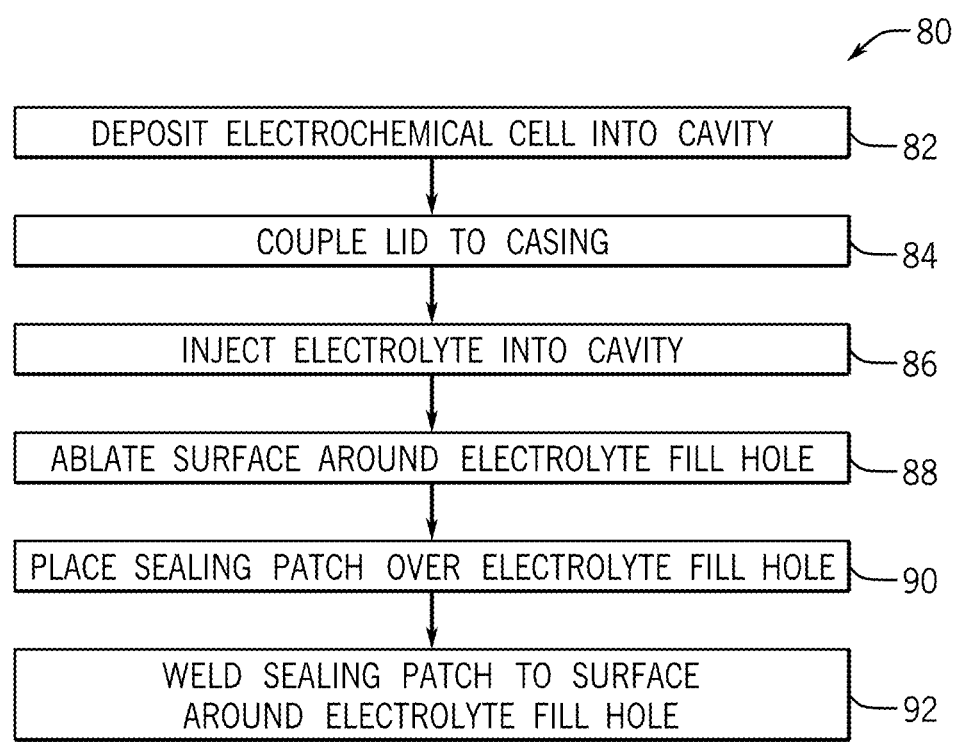

FIG. 12 is a perspective view of another embodiment a battery cell being assembled for use in the battery module of FIG. 4, the battery cell having an electrolyte fill hole and a sealing patch, in accordance with an embodiment of the present approach; and FIG. 13 is a flowchart illustrating a method of sealing the electrolyte fill hole on the battery cell of FIG. 4, in accordance with an embodiment of the present approach.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Individual battery cells within the disclosed battery systems may use a liquid electrolyte, which may be injected into the cavity of the battery cell via an electrolyte fill hole formed in the battery cell casing (the housing of the cells). In some processes, the electrolyte fill hole is sealed after injection using, for example, a rivet, plug, or ball. The plug or ball may be made of a material that expands to seal the electrolyte fill hole. In some embodiments, a gasket or washer may be disposed around the electrolyte fill hole in addition to another sealing element such as the rivet, plug, and ball mentioned above. Further, in some embodiments, welding (e.g., traditional, ultrasonic) may be used in lieu of or in addition to other methods of sealing the electrolyte fill hole. However, if the material around the electrolyte fill hole is not uniform in structure, then the sealing process (e.g., the expansion of the plug or ball, insertion of the rivet, attachment of the gasket) may cause, as an example, small cracks to form around the electrolyte fill hole. Electrolyte may then leak from the battery cell through the small cracks, while other contaminants introduced during manufacturing and use may leak into the battery cell through the small cracks.

It is now recognized that, in some embodiments, the electrolyte fill hole may be sealed by laser welding a sealing patch to the surface of the battery casing around the electrolyte fill hole to minimize the amount and severity of cracks formed around the electrolyte fill hole. Indeed, in certain embodiments, the weld depth may extend only partially through the surface of the casing, which may reduce the likelihood and severity of crack formation (or similar structural deformations) in the surface. Additionally, prior to laser welding or during the laser welding process, the surface of the casing may be ablated with a laser to remove electrolyte residue and contaminates near the electrolyte fill hole. The electrolyte fill hole may also be formed on a bottom wall of the casing, as opposed to a top surface that may include terminals, vents, and other components that may introduce non-uniformity in the structure of the surface. Finally, in some embodiments, other methods of sealing such as epoxies and plastic stoppers may be used in conjunction with the sealing patch.

Figure 1:
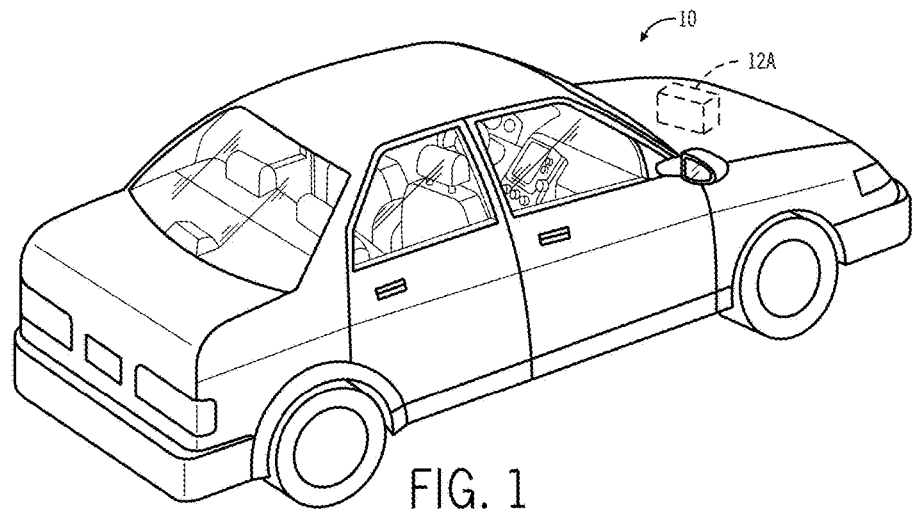
FIG. 1 is a schematic view of an embodiment of an xEV, in accordance with an embodiment of the present approach.

With the foregoing in mind, FIG. 1 is a perspective view of an xEV 10 in the form of an automobile (e.g., a car) having a battery system 12 in accordance with present embodiments for providing all or a portion of the power (e.g., electrical power and/or motive power) for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles, etc.), as well as the ignition of the internal combustion engine, during start-stop cycles. Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power.

As shown in FIG. 1, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Alternately, the battery system 12 may be positioned in the trunk or rear of the vehicle. In general, the location of the battery system 12 may differ within individual vehicles 10 based on a variety of factors. For example, the position of the battery system 12 may be selected based on the available space within a vehicle, the desired weight balance of the vehicle, and the location of other components used with the battery system 12 (e.g., battery management systems, vents or cooling devices, etc.).

Figure 2:
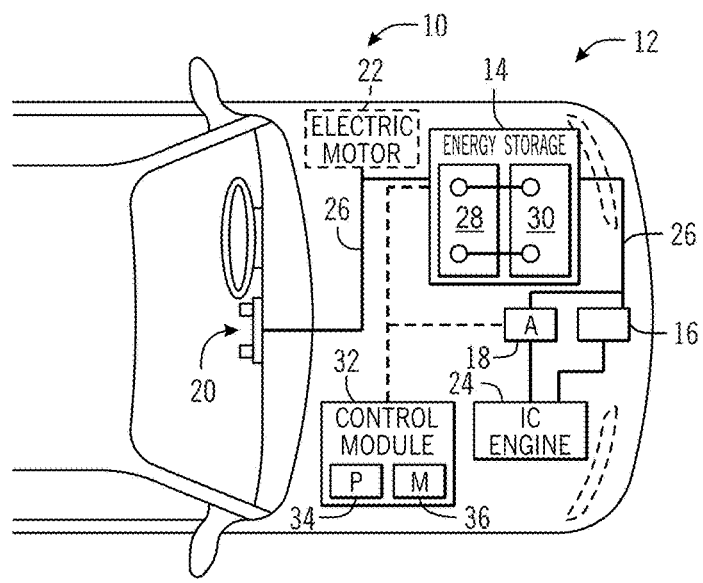
FIG. 2 is a partial schematic view of the xEV of FIG. 1, illustrating power distribution throughout the xEV, in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a system bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 28 and a lead-acid (e.g., a second) battery module 30, which each of which may include one or more battery cells. In other embodiments, the energy storage component 14 may include any number of battery modules. Additionally, although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30, perform load balancing between the battery modules 28 and 30, determine a state of charge of each battery module 28 or 30, sense operation parameters such as the voltage and temperature of each battery module 28 or 30, control voltage output by the alternator 18 and/or the electric motor 22, and the like. Although the control module 32 is illustrated in FIG. 2 as being separate from the energy storage component 14, it may be integrated into the energy storage component 14 or integrated into one or more battery modules 28 and 30.

The control module 32 may include one or more processors 34 and one or more memories 36. More specifically, the processor 34 may include one or more application specific integrated circuits (ASICs), one or more field programmable gate arrays (FPGAs), one or more general purpose processors, or any combination thereof, under software or firmware control as appropriate. Additionally, the memory 36 may include volatile memory, such as random access memory (RAM), and/or non-volatile memory, such as read-only memory (ROM), optical drives, hard disc drives, or solidstate drives. In some embodiments, the control module 32 may include portions of a vehicle control unit (VCU) and/or a separate battery control module.

While the battery modules in the energy storage component 14 may be connected in any suitable arrangement, for the purposes of the examples discussed herein, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26.

Figure 3:
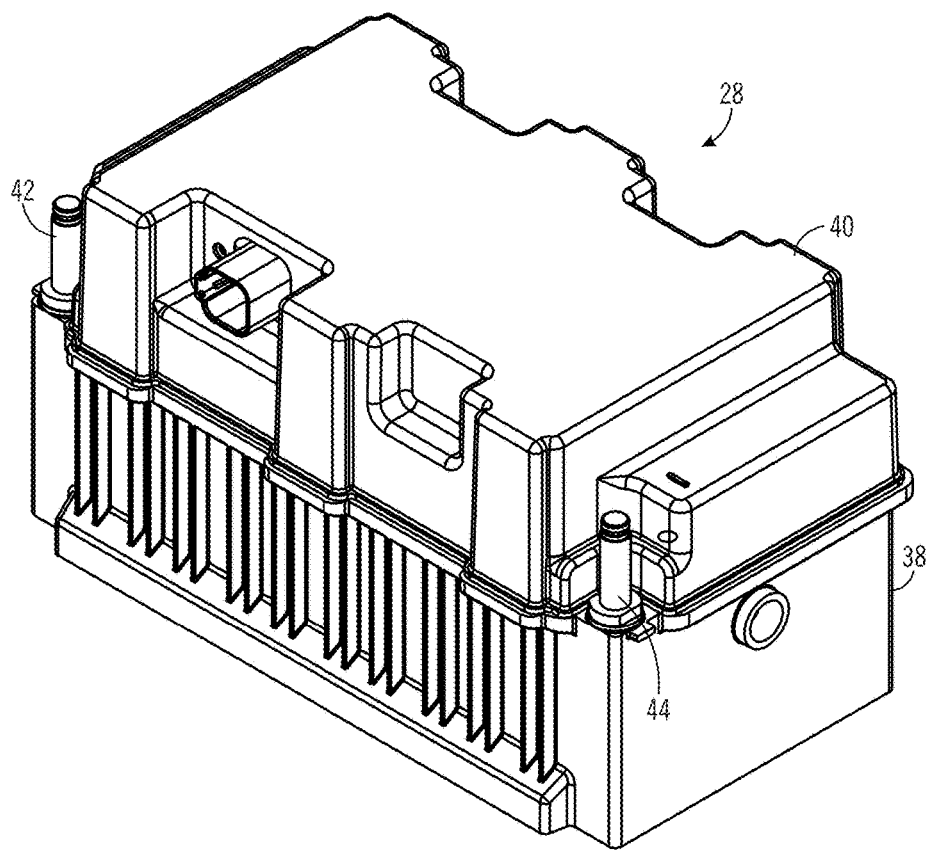
FIG. 3 is a perspective view of a battery module for use in the battery system of FIG. 1, in accordance with an embodiment of the present approach.

Turning to FIG. 3, present embodiments include the lithium ion battery module 28, which may be considered generally representative of a battery module that is a non-lead acid battery (e.g., a battery module including ultracapacitors, nickel-zinc batteries, nickel-metal hydride batteries, and lithium batteries). Further, the lithium ion battery module 28 may include certain features that facilitate the relatively easy and cost efficient manufacture of the lithium ion battery module 28. Additionally, the lithium ion battery module 28 may include features that enable a relatively small packaging of the lithium ion battery module 28, such that the lithium ion battery module 28 may conform to an overall geometry or dimensions that are comparable to, or smaller than, the dimensions of a lead-acid battery, as noted above.

In the illustrated embodiment, the lithium ion battery module 28 includes a lower housing 38 and a cover 40 that are coupled together to form an enclosure of the lithium ion battery module 28. As described in detail below, this enclosure may hold a number of prismatic battery cells, bus bars, printed circuit boards, and other equipment used to store and provide power at a desired voltage output. The battery terminals 42 and 44 extend out of the enclosed lithium ion battery module 28 for coupling of an external load to the lithium ion battery module 28.

FIG. 4 is an exploded perspective view of the lithium ion battery module 28 of FIG. 3. As illustrated, the lithium ion battery module 28 may include, among other things, the lower housing 38, battery cells 48 disposed in the lower housing 38, a lid assembly 50, a printed circuit board (PCB) assembly 52, battery terminals 42 and 44, and the cover 40. The lower housing 38 and the cover 40 form an outer enclosure for the lithium ion battery module 28, and the battery cells 48, the lid assembly 50, and the PCB assembly 52 are held within this enclosure. The battery terminals 42 and 44 are configured to protrude out of the enclosure formed by the lower housing 38 and the cover 40, in order to facilitate attachment of an outside electric load to the lithium ion battery module 28.

In the illustrated embodiment, the lithium ion battery module 28 includes a plurality of individual battery cells 48. As illustrated, the battery cells 48 may be arranged in a face-to-face, or stacked, orientation relative to each other. The battery cells 48 may be coupled in series within the lithium ion battery module 28 to provide a desired voltage output. Although the illustrated embodiment includes thirteen such battery cells 48, the lithium ion battery module 28 may include any number of individual battery cells 48 coupled together in series, parallel, or a combination thereof, to provide the desired voltage output. Further, in some embodiments, the size, design, and other features of the battery cells 48 may differ from those shown.

Figure 5:
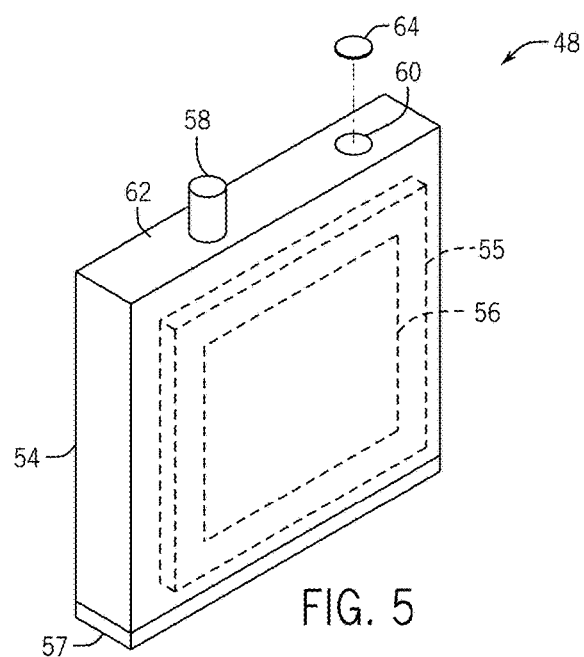
FIG. 5 is a perspective view of an embodiment of a battery cell for use in the battery module of FIG. 4, the battery cell having an electrolyte fill hole and a sealing patch, in accordance with an embodiment of the present approach.

Each battery cell 48 includes a casing 54, as shown in FIG. 5. The casing 54 is a structure that has walls (e.g., three, four) defining a cavity 55 that contains the electrochemical elements 56 (e.g., positive and negative electrodes) of the battery cell 48. For example, in certain embodiments, the casing 54 may consist of a single prismatic piece of material formed to include a cavity while in other embodiments, the casing 54 may consist of one or more piece of material coupled to one another to form a prismatic shape and include a cavity. The casing may be made of metal (e.g., aluminum), a polymer, or any suitable combinations. A lid 57 is then coupled to the casing 54 to seal the cavity 55. Thus, the casing 54 and the lid 57 may form an enclosure for the battery cell 48. One or more cell terminals 58 may protrude from the casing 54 or the lid 57; the cell terminals 58 may extend through an aperture formed in the casing 54 or lid 57 or may be formed from the casing 54 or lid 57. For instance, FIG. 5, as well as subsequent figures, depicts an embodiment of the battery cell 48 in which the cell terminals 58 protrude from a bottom wall of the casing 54. The cell terminals 58 of the battery cell 48 are electrically coupled to the corresponding cell terminals 58 of the other battery cells 48, as shown in FIG. 4, to produce a certain voltage and capacity at the battery terminals 42 and 44.

The battery cell 48 also includes an electrolyte fill hole 60 disposed on a bottom wall 62 opposite the lid 57. The electrolyte fill hole 60 enables a liquid electrolyte to be injected into the cavity of the casing 54. In some embodiments, the electrolyte fill hole 60 is then sealed using a rivet, plug, ball, gasket, and/or various types of welding (e.g., traditional, ultrasonic, etc.). However, if the structure of the lid 57 is not uniform around the electrolyte fill hole 60, then small cracks may form on the bottom wall 62 around the electrolyte fill hole 60 during the sealing process. Electrolyte may then leak from the cavity of the battery cell 48 through the small cracks. Additionally, contaminants from the manufacturing process of the lithium ion battery module 28 as well as from average use may be introduced into the cavity through the small cracks.

To minimize the amount and severity of cracks in the bottom wall 62, and any corresponding contamination and/or leakage, the electrolyte fill hole 60 may be sealed using a substantially flat sealing patch 64. The sealing patch 64 may be a disk, or any other suitable shape, of aluminum foil or any other suitable material. In certain embodiments, the sealing patch 64 may have a thickness of 150 microns to 300 microns, which may enable the sealing patch to be coupled to the bottom wall 62 using laser welding processes. That is, the sealing patch 64 may have a thickness chosen to reduce the amount of power used by the laser to weld the sealing patch 64, thereby reducing an energy consumption of the laser welding system. For instance, in certain embodiments, the sealing patch 64 may have a thickness chosen such that the peak power output of the laser welding process is 1500 W to 2200 W. The sealing patch 64 may have a diameter of 6 mm to 10 mm, while the electrolyte fill hole 60 may have a diameter of 2.5 mm to 4 mm. That is, the sealing patch 64 may be designed such that it covers not only the electrolyte fill hole 60 but also a portion of the surface around the electrolyte fill hole 60.

As noted above, the electrolyte fill hole 60 may be located on the bottom wall 62 of the battery cell 48. That is, the electrolyte fill hole 60 may be located on a wall of the casing 54 opposite the lid 57, similar to the location of the cell terminals 58. However, it is within the scope of the present disclosure for the electrolyte fill hole 60 to be located on any surface or wall of the casing 54 (e.g., the lid 57).

Figure 6:
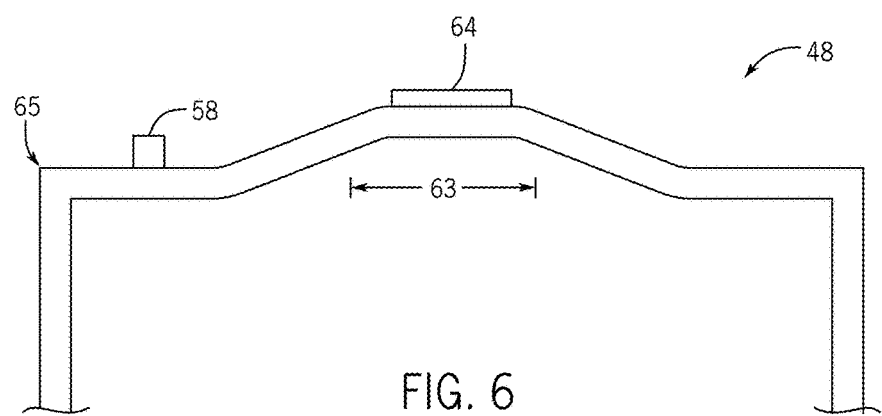
FIG. 6 is a cross-sectional view of the bottom wall of the battery cell of FIG. 5, in accordance with an embodiment of the present approach.
Figure 7:
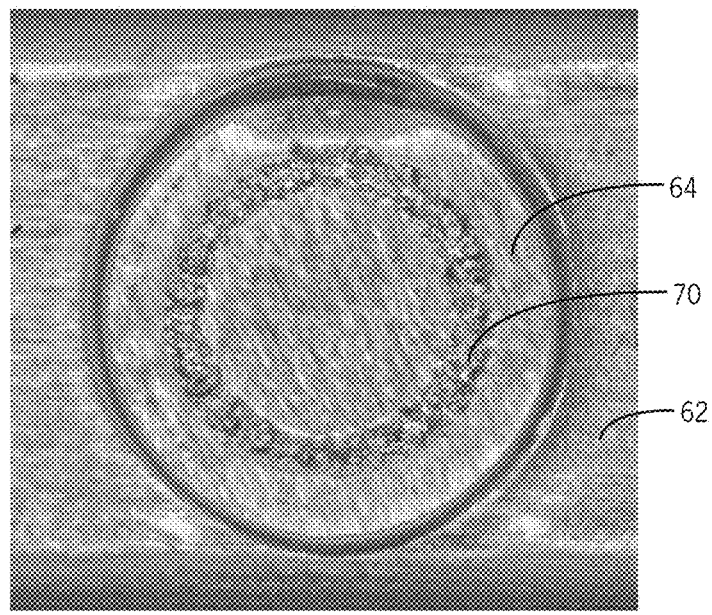
FIG. 7 is an overhead view of the weld between the sealing patch and the bottom wall of the battery cell of FIG. 5, in accordance with an embodiment of the present approach

As shown in FIG. 6, a portion 63 of the bottom wall 62 around the electrolyte fill hole 60 may be raised in certain embodiments to better facilitate access to the electrolyte fill hole 60. In particular, FIG. 6 depicts an embodiment in which a portions 63 of the bottom wall 62 is raised relative to an edge 65 between the bottom wall 62 and another surface (e.g., a sidewall) of the casing 54. When sealing the electrolyte fill hole 60, the bottom wall 62 around the electrolyte fill hole 60 may be ablated using a laser. The ablation may etch the surface around the electrolyte fill hole 60 to remove electrolyte residue from the injection process (as well as contaminants) near the electrolyte fill hole 60. The sealing patch 64 may then be placed over the electrolyte fill hole 60 and laser welded to the bottom wall 62 to seal the electrolyte fill hole 60. The sealing process may employ a pulsed continuous width fiber laser with a pulse rate between 150 Hz and 250 Hz, although other types of laser welding such as gas laser welding may be used. As shown in FIG. 7, the spot size of the laser may range from 200 microns to 300 microns, and may follow a weld pattern 70 that has an outer diameter from 4 mm to 8 mm. As noted above, the diameter of the electrolyte fill hole 60 may range from 2.5 mm to 4 mm, which is less than that of the weld pattern 70, while the diameter of the sealing patch 64 is between 6 mm and 10 mm. Accordingly, there may be a clearance between the edge of the sealing patch 64 and the periphery of the weld pattern 70.

Figure 8:
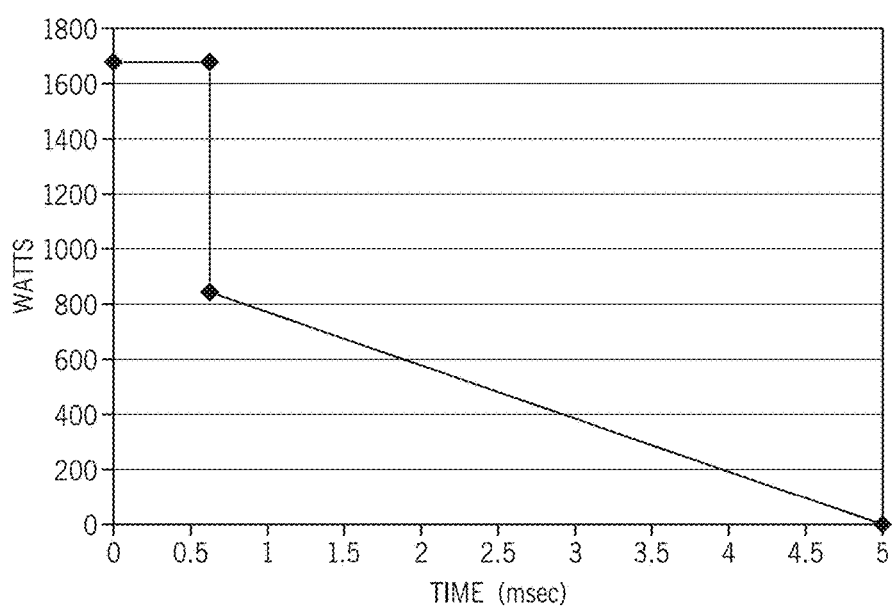
FIG. 8 is a graph depicting the power output of the laser used to laser weld the sealing patch to the bottom wall of the battery cell of FIG. 5, in accordance with an embodiment of the present approach.

FIG. 8 depicts the power output of the laser during each pass of the laser weld. The pulse may have a substantially flat portion for a short period of time followed by a tapered portion for the remainder of the pulse duration. For instance, FIG. 8 depicts a pulse that ranges from 1650 W to 1700 W for the first 0.5 ms to 1 ms, before dropping to a value between 800 and 850 W and then tapering to 0 W at 5 ms. In certain embodiments, the multi-pass laser weld may be completed in as little as 0.51 seconds.

Figure 9:
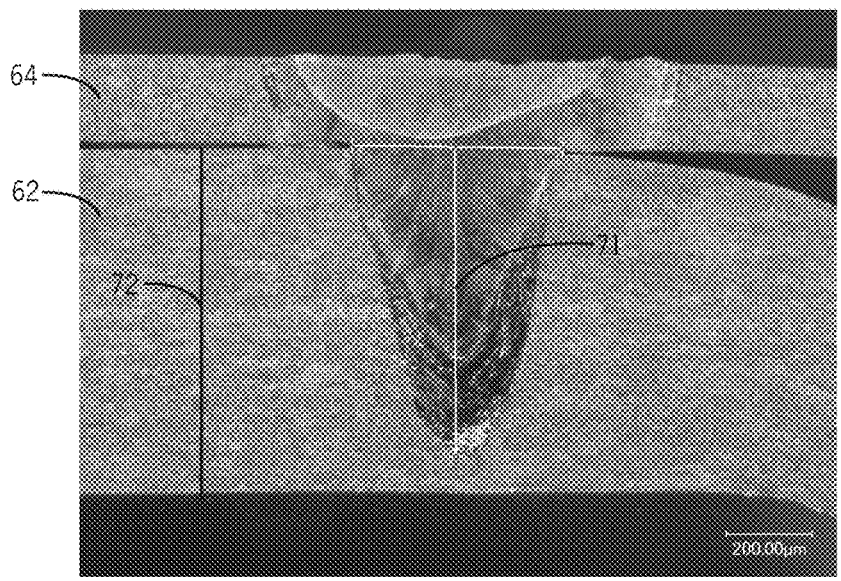
FIG. 9 is a cross-sectional view of the weld between the sealing patch and the bottom wall of the battery cell of FIG. 5, in accordance with an embodiment of the present approach.

The weld between the sealing patch 64 and the bottom wall 62 may be a partial penetration weld, in that the weld depth only partially penetrates the bottom wall 62 around the electrolyte fill hole 60. That is, as shown in FIG. 9, the laser weld may have a depth 71 that is less than a thickness 72 of the bottom wall 62. For example, FIG. 9 depicts an embodiment in which the weld has a depth 71 of approximately 722 microns, which is less than the thickness 72 of the bottom wall 62. The depth 71 may vary relative to the thickness 72. For example, the depth 71 may be less than half of the thickness 72 in certain embodiments (e.g., the depth 71 is ⅕ of the thickness 72), while in other embodiments, the depth 71 may be greater than half of the thickness 72 but less than the thickness 72 (e.g., the depth 71 is ¾ or ⅝ of the thickness 72). Using a partial penetration weld to seal the electrolyte fill hole 60 may reduce the likelihood and severity of crack formation in the bottom wall 62 around the electrolyte fill hole 60.

Figure 10:
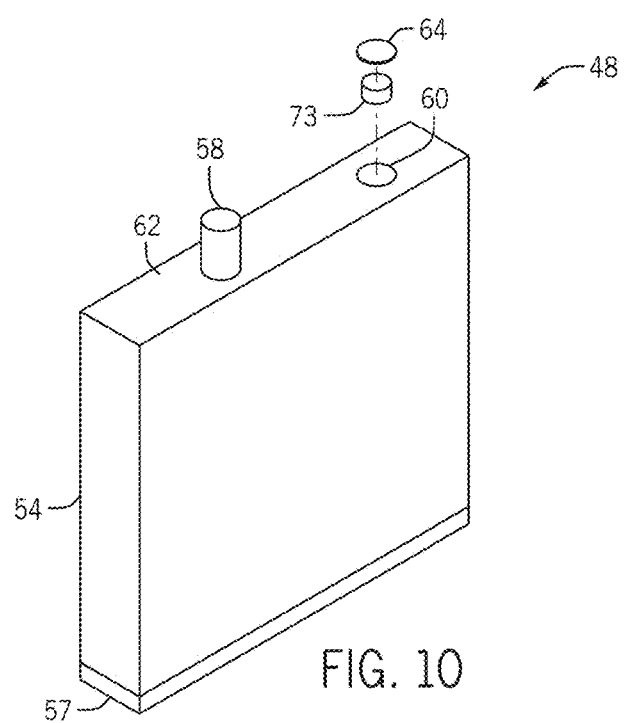
FIG. 10 is a perspective view of another embodiment a battery cell being assembled for use in the battery module of FIG. 4, the battery cell having an electrolyte fill hole and a sealing patch, in accordance with an embodiment of the present approach.
Figure 11:
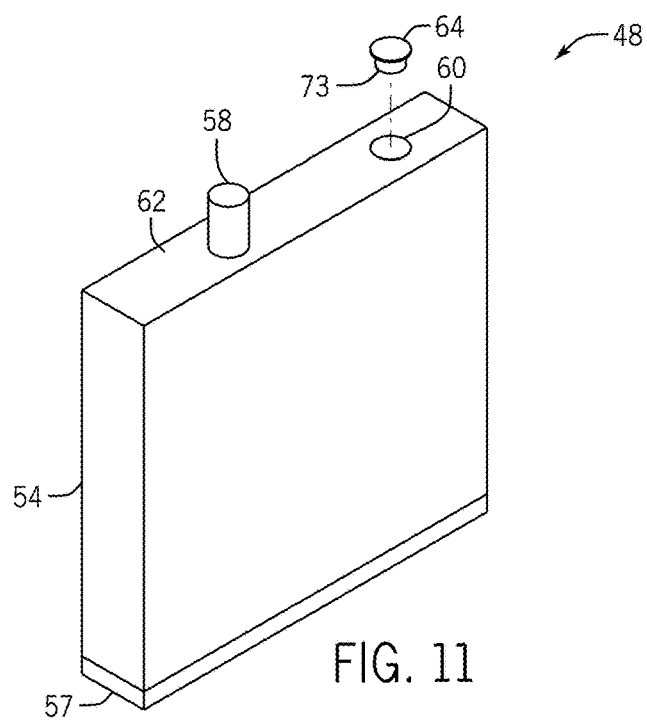
FIG. 11 is a perspective view of another embodiment a battery cell being assembled for use in the battery module of FIG. 4, the battery cell having an electrolyte fill hole and a sealing patch, in accordance with an embodiment of the present approach.

Further, in some embodiments, the sealing patch 64 may be used in conjunction with other sealing devices. For example, FIGS. 10 and 11 both depict the sealing patch 64 used in conjunction with a plastic stopper 73. The plastic stopper 73 may be any suitable type of plastic having substantially the same shape and size as the electrolyte fill hole 60, and may be disposed within the electrolyte fill hole 60 to create a secondary seal. That is, the sealing patch 64 may be a primary seal included in all of the present embodiments of the battery cell 48, while the plastic stopper 73 may provide additionally sealing capability in certain embodiments of the battery cell 48. The plastic stopper 73 may be separate from the sealing patch 64, as shown in FIG. 10, or may be coupled to the sealing patch 64, as shown in FIG. 11. The plastic stopper 73 may also be tapered lengthwise or along the longitudinal axis of the stopper, such that the top of the plastic stopper 73 may be substantially the same size as the electrolyte fill hole 60 but may reduce in width down the length of the plastic stopper 73. A tapered plastic stopper 73 may have a reduced surface area within the cavity 55 than a non-tapered plastic stopper 73, which may result in a larger amount of electrolyte within the cavity 55 compared to embodiments that utilize a non-tapered plastic stopper 73.

As shown in FIG. 12, an epoxy 74 may be disposed on the bottom wall 62 around the electrolyte fill hole 60. The epoxy 74 may reinforce the structure of the bottom wall 62 and/or may seal any cracks that form in the bottom wall 62 during laser welding of the sealing patch 64. The epoxy 74 may be disposed on the bottom wall 62 or after laser welding of the sealing patch 64.

Turning now to FIG. 13, depicted is a flowchart of an embodiment of a process 80 for sealing the electrolyte fill hole 60 using the sealing patch 64. Although the process 80 is described below in detail, the process 80 may include other steps not shown in FIG. 13. Additionally, the steps illustrated may be performed concurrently or in a different order.

Beginning at block 82, electrochemical cell elements 56 may be deposited into the cavity 55 of the casing 54. That is, the positive and negative electrodes, as well as other internal elements of the battery cell 48 (e.g., a separator) may be disposed within the cavity. The cell terminals 58 of the battery cell 48 extend through an aperture on the casing 56; the cell terminals 58 may be electrically insulated from or may be electrically coupled to the casing 54 at block 82.

Next, at block 84, the lid 57 may be affixed to and coupled to the casing 54, to seal the cavity 55. The lid 57 may be coupled to the casing 54 using a series of protrusions and grooves on the lid 57 and the casing 54. Alternately or additionally, the lid 57 may be coupled to the casing 54 by welding (e.g., laser welding, ultrasonic welding).

A liquid electrolyte may then be injected into the cavity 55 at block 86. As noted above, the electrolyte may be injected into the cavity 55 via the electrolyte fill hole 60, which may be located on the bottom wall 62 of the casing 54.

At block 88, the surface around the electrolyte fill hole 60 may be ablated with a laser. As noted above, ablating the surface around the electrolyte fill hole 60 may remove electrolyte residue remaining on the casing from injection, as well as contaminants on the surface.

The sealing patch 64 may be placed over the electrolyte fill hole 60 at block 90. As stated above, the sealing patch 64 may be designed to cover the electrolyte fill hole 60 as well as a portion of the bottom wall 62 around the electrolyte fill hole 60. Further, in embodiments of the battery cell 48 that include the plastic stopper 73, the plastic stopper 72 may be disposed in and/or around the electrolyte fill hole 60 prior to the step illustrated by block 90. In other embodiments, the epoxy 74 may be disposed after placing and welding the sealing patch 64 over the electrolyte fill hole 60.

Finally, at block 92, the sealing patch 64 may be laser welded to the bottom wall 62 around the electrolyte fill hole 60. The weld between the sealing patch 64 and the bottom wall 62 may be a partial penetration weld to reduce the amount and severity of crack formation in the bottom wall 62 around the electrolyte fill hole 60, as noted above.

One or more of the disclosed embodiments, alone or on combination, may provide one or more technical effects including reducing the amount of electrolyte leakage from a battery cell. In particular, the disclosed embodiments may reduce the amount and severity of cracks formed in a surface of the battery cell during sealing of an electrolyte injection hole, thereby reducing the amount of electrolyte leaking out of the battery cell as well as contaminants leaking into the battery cell. For instance, the battery cell may include a sealing patch laser welded around an electrolyte fill hole. Using a partial penetration weld may reduce the amount and severity of cracks formed in the surface of around the electrolyte fill hole. The electrolyte fill hole may be formed on a bottom wall of the battery cell. That is, the electrolyte fill hole may be formed on a surface that does not include or serve as a mount for other components (e.g., a cell terminal), which may improve the uniformity of the structure of the surface, thereby reducing the likelihood and severity of crack formation during the sealing process. Other embodiments may use other sealing methods in addition to the sealing patch, such as epoxy around the electrolyte fill hole and plastic stoppers located within the electrolyte fill hole. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A lithium-ion battery cell, comprising:
   an enclosure comprising a casing and a lid, the enclosure having an electrolyte fill hole extending in an axial direction through a surface of the casing opposite the lid, wherein the electrolyte fill hole comprises a first diameter, and wherein the first diameter is constant along the axial direction;
   an electrochemical cell disposed within the enclosure;
   a sealing patch laser welded to the surface of the casing around the electrolyte fill hole, wherein the sealing patch is configured to seal the electrolyte fill hole and the sealing patch does not extend into the electrolyte fill hole;
   a laser weld between the sealing patch and the casing, wherein the laser weld is a partial penetration weld in which a depth of the laser weld extends through an entire thickness of the sealing patch and into the casing between a quarter of a thickness of the casing around the electrolyte fill hole and three quarters of the thickness of the casing around the electrolyte fill hole, such that a likelihood of crack formation in the surface of the casing around the electrolyte fill hole is reduced; and
   an epoxy disposed between the surface of the casing and the sealing patch around the electrolyte fill hole, wherein the epoxy is configured to seal cracks in the enclosure generated during formation of the laser weld.

2. The lithium-ion battery cell of claim 1, wherein the sealing patch is laser welded to the surface of the casing by a laser pulse having a pulse rate between 150 Hz and 250 Hz and a spot size between 200 microns to 300 microns such that a gap is formed between an edge of the sealing patch and the weld between the sealing patch and the surface of the casing.

3. The lithium-ion battery cell of claim 2, wherein the sealing patch and the casing both comprise a metal.

4. The lithium-ion battery cell of claim 1, wherein the sealing patch has a thickness to allow the sealing patch to be laser welded to the surface of the casing by a laser welding process having a peak power output between 1500 W and 2200 W.

5. The lithium-ion battery cell of claim 1, wherein the sealing patch has a second diameter that is greater than the first diameter, and the laser weld between the sealing patch and the surface of the casing has a third diameter that is greater than the first diameter and less than the second diameter.

6. The lithium-ion battery cell of claim 1, comprising a plastic stopper disposed within the electrolyte fill hole and configured to provide additional sealing of the electrolyte fill hole.

7. The lithium-ion battery cell of claim 6, wherein the plastic stopper is tapered along the axial direction.

8. The lithium-ion battery cell of claim 1, wherein the casing is a prismatic casing.

9. The lithium-ion battery cell of claim 1, wherein the surface of the casing around the electrolyte fill hole is etched.

10. The lithium-ion battery cell of claim 1, wherein the electrolyte fill hole is disposed in a base of the casing, wherein the base of the casing is opposite the lid.

11. The lithium-ion battery cell of claim 1, wherein a first portion of the casing around the electrolyte fill hole is raised relative to other portions of the casing.

12. A method of manufacturing a lithium-ion battery cell, comprising:
   injecting a liquid electrolyte into a cavity of an enclosure of the lithium-ion battery cell via an electrolyte fill hole, wherein the enclosure comprises a casing, a lid, and an electrochemical cell disposed within the cavity, wherein the electrolyte fill hole extends in an axial direction through a surface of the casing opposite the lid, wherein the electrolyte fill hole comprises a diameter, and wherein the diameter is constant along the axial direction;
   disposing a sealing patch over the electrolyte fill hole, wherein the sealing patch covers the electrolyte fill hole and the surface of the casing around the electrolyte fill hole to seal the electrolyte fill hole, and wherein the sealing patch does not extend into the electrolyte fill hole;
   laser welding the sealing patch to the surface of the casing around the electrolyte fill hole, wherein the weld between the sealing patch and the surface of the casing is a partial penetration weld in which a depth of the partial penetration weld extends through an entire thickness of the sealing patch and into the casing between a quarter of a thickness of the casing around the electrolyte fill hole and three quarters of the thickness of the casing around the electrolyte fill hole, such that a likelihood of crack formation in the surface of the casing around the electrolyte fill hole is reduced; and
   disposing an epoxy on the surface of the casing around the electrolyte fill hole, such that the epoxy is disposed between the surface of the casing around the electrolyte fill hole and the sealing patch, wherein the epoxy is configured to seal cracks in the enclosure generated during the laser welding.

13. The method of claim 12, comprising ablating a surface of the enclosure around the electrolyte fill hole after injecting the liquid electrolyte and before disposing the sealing patch over the electrolyte fill hole.

14. The method of claim 12, comprising disposing a plastic stopper within the electrolyte fill hole after injecting the liquid electrolyte and before laser welding the sealing patch to the surface of the enclosure around the electrolyte fill hole.

15. The method of claim 12, wherein laser welding the sealing patch to the surface of the enclosure comprises using a laser pulse having a pulse rate between 150 Hz and 250 Hz and a spot size between 200 microns to 300 microns.

16. A lithium-ion battery module, comprising:
a housing having at least two terminals;
a plurality of battery cells disposed within the housing and electrically coupled to the at least two terminals, wherein each battery cell of the plurality of battery cells comprises an enclosure comprising a casing and a lid, wherein the enclosure comprises an electrolyte fill hole configured to receive an electrolyte and a sealing patch disposed over the electrolyte fill hole, wherein the electrolyte fill hole comprises a first diameter, the sealing patch comprises a second diameter that is greater than the first diameter, each battery cell comprises a plastic stopper that is separate from the sealing patch, the plastic stopper is disposed within the electrolyte fill hole, the plastic stopper is tapered along a longitudinal axis in a direction of the electrolyte fill hole through the enclosure, such that a first end of the plastic stopper proximate the sealing patch has a first width and a second end of the plastic stopper, opposite the first end, has a second width less than the first width, and the plastic stopper is configured to provide additional sealing of the electrolyte fill hole; and
a laser weld between the sealing patch and the casing, wherein the laser weld between the sealing patch and the casing comprises a third diameter that is greater than the first diameter and less than the second diameter, wherein the laser weld is a partial penetration weld in which a depth of the laser weld extends into the casing between a half of a thickness of the casing around the electrolyte fill hole and less than a full thickness of the casing around the electrolyte fill hole, such that a likelihood of crack formation in the surface of the casing around the electrolyte fill hole is reduced.

17. The lithium-ion battery module of claim 16, wherein the electrolyte fill hole is disposed on a surface of the casing, and wherein the surface of the casing is etched.

18. The lithium-ion battery module of claim 16, wherein a first portion of the casing around the electrolyte fill hole is raised relative to other portions of the casing.

19. The lithium-ion battery module of claim 16, wherein the electrolyte fill hole is disposed on a surface of the casing, and wherein each battery cell comprises an epoxy disposed on the surface of the casing around the electrolyte fill hole.

20. The lithium-ion battery module of claim 16, wherein the sealing patch comprises aluminum and the casing comprises aluminum.

21. The lithium-ion battery module of claim 16, wherein the electrolyte fill hole is disposed in a base of the casing, the base of the casing being opposite the lid.

* * * * *